United States Patent
Akirav et al.

(10) Patent No.: US 10,884,670 B2
(45) Date of Patent: *Jan. 5, 2021

(54) METHOD AND SYSTEM FOR PROCESSING DATA

(71) Applicant: INTERNATIONAL BUSINESS MACHINES CORPORATION, Armonk, NY (US)

(72) Inventors: Shay H. Akirav, Petach-Tikva (IL); Ron Edelstein, Tel Aviv (IL); Michael Hirsch, Mazkeret Batya (IL); Ariel J. Ish-Shalom, Tel-Aviv (IL); Liran Loya, Hod-Hasharon (IL); Itai Tzur, Mazkeret-Batya (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 359 days.

This patent is subject to a terminal disclaimer.

(21) Appl. No.: 15/896,202

(22) Filed: Feb. 14, 2018

(65) Prior Publication Data

US 2018/0189001 A1 Jul. 5, 2018

Related U.S. Application Data

(63) Continuation of application No. 13/647,561, filed on Oct. 9, 2012, now Pat. No. 9,933,978, which is a (Continued)

(51) Int. Cl.
*G06F 16/00* (2019.01)
*G06F 3/06* (2006.01)
*G06F 16/174* (2019.01)

(52) U.S. Cl.
CPC .......... *G06F 3/0661* (2013.01); *G06F 3/0608* (2013.01); *G06F 3/0641* (2013.01);
(Continued)

(58) Field of Classification Search
CPC .................................................. G06F 16/1752
See application file for complete search history.

(56) References Cited

U.S. PATENT DOCUMENTS

| 5,600,826 A | 2/1997 | Ando |
| 5,963,963 A | 10/1999 | Schmuck et al. |

(Continued)

FOREIGN PATENT DOCUMENTS

| JP | 04211844 A | 8/1992 |
| JP | 2004287932 A | 10/2004 |

(Continued)

*Primary Examiner* — Khanh B Pham
(74) *Attorney, Agent, or Firm* — Griffiths & Seaton PLLC

(57) ABSTRACT

Methods, computer systems, and computer program products for processing data a computing environment are provided. The computer environment for data deduplication storage receives a plurality of write operations for deduplication storage of the data. The data is buffered in a plurality of buffers with overflow temporarily stored to a memory hierarchy when the data received for deduplication storage is sequential or non sequential. The data is accumulated and updated in the plurality of buffers per a data structure, the data structure serving as a fragment map between the plurality of buffers and a plurality of user file locations. The data is restructured in the plurality of buffers to form a complete sequence of a required sequence size. The data is provided as at least one stream to a stream-based deduplication algorithm for processing and storage.

20 Claims, 6 Drawing Sheets

Related U.S. Application Data continuation of application No. 12/970,828, filed on Dec. 16, 2010, now Pat. No. 8,332,372.

(52) U.S. Cl.
CPC .......... *G06F 3/0656* (2013.01); *G06F 3/0682* (2013.01); *G06F 16/1752* (2019.01)

(56) References Cited

U.S. PATENT DOCUMENTS

| | | | |
|---|---|---|---|
| 6,088,767 A | 7/2000 | Dan et al. | |
| 6,185,575 B1 | 2/2001 | Orcutt | |
| 6,405,237 B1 | 6/2002 | Khalidi et al. | |
| 6,567,887 B2 | 5/2003 | Harmer | |
| 6,594,674 B1 | 7/2003 | Kaplan et al. | |
| 6,643,654 B1 | 11/2003 | Patel et al. | |
| 6,934,942 B1 | 8/2005 | Chilimbi | |
| 7,043,637 B2 | 5/2006 | Bolosky et al. | |
| 7,092,956 B2 | 8/2006 | Ruediger | |
| 7,162,486 B2 | 1/2007 | Patel et al. | |
| 7,200,604 B2 | 4/2007 | Forman et al. | |
| 7,308,463 B2 | 12/2007 | Taulbee et al. | |
| 7,360,047 B2 | 4/2008 | Muto | |
| 7,478,116 B2 | 1/2009 | Sreenivas et al. | |
| 7,801,127 B2 | 9/2010 | Beeson et al. | |
| 7,962,452 B2 | 6/2011 | Anglin | |
| 8,055,618 B2 | 11/2011 | Anglin | |
| 8,204,868 B1 * | 6/2012 | Wu | G06F 16/1748 707/693 |
| 8,234,468 B1 | 7/2012 | Deshmukh et al. | |
| 8,315,992 B1 | 11/2012 | Gipp et al. | |
| 8,332,372 B2 | 12/2012 | Tzur et al. | |
| 8,370,315 B1 | 2/2013 | Efstathopoulos et al. | |
| 8,412,848 B2 | 4/2013 | Therrien et al. | |
| 8,451,170 B2 | 5/2013 | Foerster et al. | |
| 8,578,091 B2 | 11/2013 | Thomas et al. | |
| 8,660,994 B2 | 2/2014 | Slater et al. | |
| 8,671,265 B2 * | 3/2014 | Wright | G06F 15/173 711/206 |
| 8,719,234 B2 | 5/2014 | Akirav et al. | |
| 8,812,738 B2 | 8/2014 | Therrien et al. | |
| 8,825,605 B2 | 9/2014 | Nayak | |
| 9,256,368 B2 | 2/2016 | Welnicki et al. | |
| 2004/0003314 A1 | 1/2004 | Witt et al. | |
| 2004/0187075 A1 | 9/2004 | Maxham et al. | |
| 2005/0066190 A1 | 3/2005 | Martin | |
| 2005/0203864 A1 | 9/2005 | Schmidt et al. | |
| 2005/0246376 A1 | 11/2005 | Lu et al. | |
| 2006/0020646 A1 | 1/2006 | Tee et al. | |
| 2006/0282475 A1 | 12/2006 | Suermondt et al. | |
| 2007/0069023 A1 | 3/2007 | Jones et al. | |
| 2008/0133561 A1 | 6/2008 | Dubnicki et al. | |
| 2008/0294705 A1 | 11/2008 | Brauckhoff et al. | |
| 2009/0019504 A1 | 1/2009 | Huang et al. | |
| 2009/0164535 A1 | 6/2009 | Gandhi et al. | |
| 2009/0171888 A1 | 7/2009 | Anglin | |
| 2010/0070478 A1 | 3/2010 | Anglin | |
| 2010/0077161 A1 | 3/2010 | Stoakes et al. | |
| 2010/0208753 A1 | 8/2010 | Brown | |
| 2010/0332456 A1 | 12/2010 | Prahlad et al. | |
| 2011/0022718 A1 | 1/2011 | Evans et al. | |
| 2011/0055171 A1 | 3/2011 | McNutt | |
| 2012/0016846 A1 | 1/2012 | Anglin | |
| 2012/0017060 A1 | 1/2012 | Kapanipathi et al. | |
| 2012/0036113 A1 | 2/2012 | Lillibridge et al. | |
| 2012/0059863 A1 | 3/2012 | Thomson et al. | |
| 2012/0131025 A1 | 5/2012 | Cheung et al. | |
| 2012/0158671 A1 | 6/2012 | Tzur et al. | |
| 2012/0324203 A1 | 12/2012 | Matoba | |
| 2013/0339319 A1 | 12/2013 | Woodward et al. | |
| 2015/0074361 A1 * | 3/2015 | Hughes | G06F 12/0862 711/159 |
| 2015/0205816 A1 | 7/2015 | Periyagaram et al. | |
| 2015/0254268 A1 | 9/2015 | Sharma et al. | |

FOREIGN PATENT DOCUMENTS

| | | |
|---|---|---|
| JP | 2008077290 A | 4/2008 |
| JP | 2008282072 A | 11/2008 |
| WO | 2009091957 A2 | 7/2009 |
| WO | 2009144942 A1 | 12/2009 |

\* cited by examiner

METHOD AND SYSTEM FOR PROCESSING DATA

REFERENCE TO RELATED APPLICATION

This Application is a Continuation of U.S. patent application Ser. No. 13/647,561, filed on Oct. 9, 2012, which is a Continuation of U.S. patent application Ser. No. 12/970,828, now U.S. Pat. No. 8,332,372, filed on Dec. 16, 2010, the contents of each being incorporated herein by reference.

BACKGROUND OF THE INVENTION

Field of the Invention

The present invention relates in general to computers, and more particularly to methods, computer systems, and computer program products for processing data in a deduplication system.

Description of the Related Art

Data deduplication refers to the reduction and/or elimination of redundant data. In a data deduplication process, duplicate copies of data are reduced or eliminated, leaving a minimal amount of redundant copies, or a single copy of the data, respectively. Using deduplication processes provides a variety of benefits, such as reduction of required storage capacity and reduced need for network bandwidth. Due to these and other benefits, deduplication has emerged in recent years as a highly important technological field in computing storage systems. Challenges to providing deduplication functionality include aspects such as efficiently finding duplicated data patterns in typically large storage repositories, and storing the data patterns in a deduplicated storage-efficient form.

SUMMARY OF THE DESCRIBED EMBODIMENTS

Methods, computer systems, and computer program products embodiments for processing data in a computing environment are provided. In one exemplary embodiment, by way of example only, the computer environment for data deduplication storage receives a plurality of non-sequential write operations for deduplication storage of the data, which data is stored in a plurality of user file locations. The data is accumulated and updated in the plurality of buffers per a data structure, the data structure serving as a fragment map between the plurality of buffers and the plurality of user file locations. The data is restructured in the plurality of buffers to form a complete sequence of a required sequence size. The data is provided as at least one stream to a stream-based deduplication algorithm for processing and storage. A defragmentation process is performed after each of closing a plurality of user files, an arbitrary time period, and when the plurality of user files are determined to be quiescent, the defragmentation operation rearranging streams in each of the plurality of user files into a single stream.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
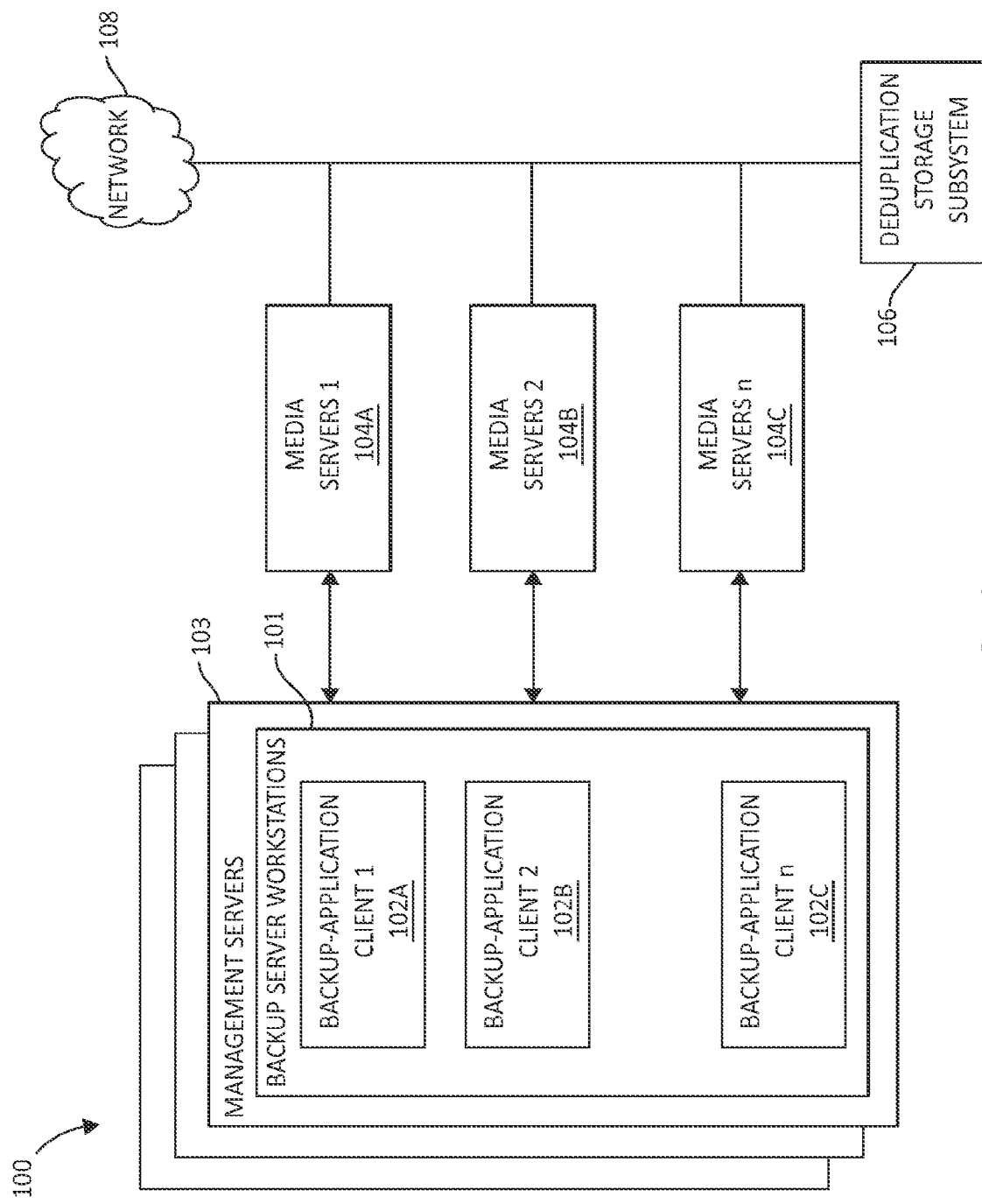
FIG. 1 illustrates an exemplary computing environment in which aspects of the present invention may be implemented.

Throughout the following description and claimed subject matter, the following terminology, pertaining to the illustrated embodiments, is described.

A "pool of buffers" is intended to refer to multiple buffers each capable of holding a single fragment. The "pool of buffers" may also be referred to as a pool of memory buffers, and may be used in connection and contemplation of a memory hierarchy structure.

A "fragment" is intended to refer to the logical division of the user-files to fixed-sized pieces of a predetermined size. One implementation, by example only, the fragments may have any convenient pre-determined size, but should be fixed in advance. One fragment, by example only, may use a fragment size of 64 kB. However, the fragment size may also be non-fixed.

A "user file" is intended to refer to the files that are being written by the backup application.

A "fragment map" is intended to refer to a data structure that serves to map between memory buffers and user-file locations, and vice-versa.

A "disk map" is intended to refer to an on-disk structure, which is similar to the fragment map which maps the user file fragments to compression module streams to allow the data of each user file to reside in more than one compression module stream.

A "control module" or "controller module" is intended to refer to a module configured to decide and manage what to do with each write operation received from the client over the network attached storage system (NAS) or a storage system having a random pattern of write offsets.

A "compression module" is intended to manage, assist, or perform the operations of receiving a stream of data, opening the stream of data, compressing the stream, and storing the data stream to storage. The compression module may operate independently or be configured to assist with other components in the deduplication storage subsystem to perform the receiving, opening, compressing, and storing the data streams to storage.

The present invention provides a solution and enhancement for data deduplication via a network attached system (NAS) or any random-access writing, or storage system having a random pattern of write offsets having a method using multiple memory buffers and a stream-based algorithm. Large data sets have traditionally been stored on magnetic tapes, which offer the lowest cost per stored byte along with excellent reliability and archival lifespans. However, magnetic tapes also have many drawbacks due to the need for extensive manual maintenance (loading and unloading tape cartridges, solving minor mechanical problems, transporting and storing them, etc.). Such drawbacks have prompted the development of tape virtualization products. The tape-virtualization products may use large disk-arrays to store the data, while exposing a tape-like interface to the rest of the backup system. The tape-virtualization system fits into the normal backup system just as a regular tape-library, thus allowing for no-hassle compatibility with existing systems, while keeping the actual data on disk-arrays thus doing away with most of the aforementioned drawbacks of tape systems. But these tape-emulation systems introduce another problem: Disk arrays are much more expensive per byte than tape cartridges.

Such problems may be solved by observing that, in most cases, there is a large amount of data-redundancy in the backup data set. The backup data of today's backup run is, in most cases, very similar to the backup data produced by yesterday's backup run. By identifying the similar data chunks, or data sequences, it is possible to use the same storage-space for both, thus saving much storage-space. This mechanism is called de-duplication, and it turns out that in many cases it can reduce the storage-space required as much as ten-fold, and sometimes even more. The space reduction makes disk-based tape-virtualization an economically viable proposition for replacing traditional magnetic tape, which accounts for the commercial success that de-duplicating tape-virtualization products are seeing in the market. Backup data sets are large and can be measured in Peta-Bytes. Additionally, the backup-stream has typical rates of Giga-Bytes per second. Designing a system that can process data at such rates, and find similar sequences in such a large data set is a technological challenge.

Hash-based algorithms are relatively simple to design and implement, but they suffer from one major problem: the indexes (or "hash-tables") used to look up identical blocks are very large. Assuming a block size of 8 Kilobytes, the number of entries in the index of a 1 Peta-Byte data set should be 128 GB. Assuming an entry size of a few bytes, the index can occupy approximately a terabyte of storage. Such a large index cannot be kept in memory, and therefore needs to reside on disk, where each lookup is very slow, due to the hard-disk seek-latency. Assuming an incoming data rate of 1 Giga-Bytes per second, 128 Kilo lookups are required, and it is clear that no reasonable disk-based system can accommodate such a seek-rate. Stream based solutions solve this problem by storing much fewer hash-entries per kilobytes. This allows the entire hash-table to reside in memory, where lookups are much faster, allowing for significantly higher performance and significantly larger data sets. All this comes at the expense of added algorithmic complexity relative to hash-based algorithms.

The above description refers to backup data that enters the de-duplication system in the form of a tape data stream. Backup data can also enter the system in other forms, the most notable of which is a network attached system (NAS) but may include any random-access writing method to be applicable. In the NAS configuration, the user's backup-system is configured to act as a NAS client, and write the data in the form of files, via either the NFS or the CIFS protocols. NAS scenarios are simpler for the administrator to configure, but present additional challenges that are not present in tape-virtualization scenarios. Unlike tape streams which are inherently sequential, NAS data-streams tend to exhibit random access patterns. This can originate from the application itself, but even when the application writes data with perfect sequence, the NAS protocol client that is part of most operating systems tends to buffer the data and send it to the server after introducing some randomness into the access pattern. This randomness is not intentional, but a by product of the internal design of the file-system code in operating systems which is mainly designed for block devices, where sequentiality is not of any consideration. The solution of Hash-based de-duplication algorithms can deal with random access patterns in a relatively straightforward way, because the Hash-based de-duplication algorithms "view" the data as a set of blocks, but for stream-based algorithms such application presents a challenge. The present invention proposes a method for allowing stream-based algorithms to handle such workloads, thus opening the door for reaping the performance benefits of stream-based algorithms in NAS scenarios.

The present invention is based on characteristics of stream-based systems: First, although each stream represents a continuous sequence of data-bytes, a number of streams can be aggregated into a "meta-file" or disk map, where each range of sequential bytes is represented as a stream and the meta-file keeps a record of how each stream fits into the image of the original file. Second, since stream-based algorithms store their index using blocks of a specific granularity, the present invention merges different streams into one stream without having to recalculate any hashes, as long as the merge boundaries are always kept aligned with block boundaries. The present invention uses the foregoing characteristics, a pool of buffers or pool of memory buffers, and a memory hierarchy. The memory hierarchy may include, but not limited to, RAM, flash-based devices, magnetic disk, optical storage, a variety of types of memory (including virtual), regular disks, storage disks, and may also include storage media such as a solid state drives (SSD) or other type of devices, methods, or processes typically employed by one of ordinary skill in the art.

In one embodiment, by example only, a computer environment receives a plurality of write operations for deduplication storage of the data. The data is buffered in a plurality of buffers with overflow temporarily stored to a memory hierarchy when the data received for deduplication storage is sequential or non sequential. The data is accumulated and updated in the plurality of buffers per a data structure, the data structure serving as a fragment map between the plurality of buffers and a plurality of user file locations. The data is restructured in the plurality of buffers to form a complete sequence of a required sequence size. The data is provided as at least one stream to a stream-based deduplication algorithm for processing and storage.

FIG. 1 illustrates exemplary computing storage environment 100 in which aspects of the present invention may be implemented. The architecture provides storage services to management servers 103 each containing backup server workstations 101. The management servers 103 manage the backup operations and polices. Included in the backup server workstations 101 are a number of backup-applications clients 102 that are backed up, shown in the figures as Backup-application client 1 (102A), 2 (102B), 3 (102C). Connected to both a network 108, are several media servers 104 (shown in the figures as Media Servers 104A, 104B, and 104C). A Deduplicated data subsystem 106 is provided between various media servers 104 and the network 108. Deduplication data subsystem 106 is interconnected via networking components, which provides internetwork connectivity between the components of the architecture. The network 108 may, in one embodiment, include a wide area network (WAN). In other embodiments, the network 108 may include local area networks (LANs), storage area networks (SANs), and other network topologies known to the skilled artisan. The media servers 104 channel data between the backup-application clients and the deduplication storage subsystem 106. The deduplication storage subsystem 106 receives data (write operations) via the network 108.

Figure 2:
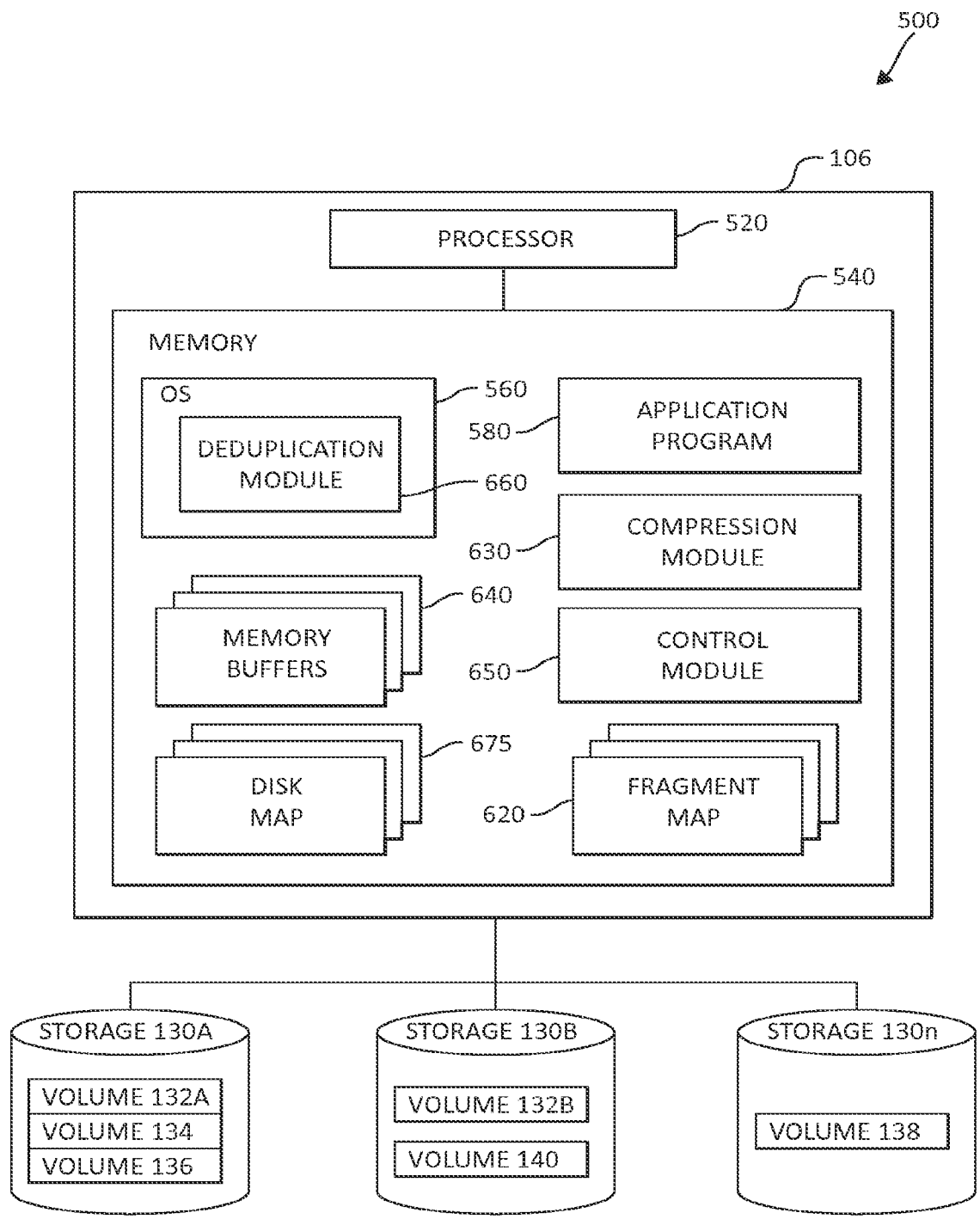
FIG. 2 illustrates an exemplary portion of a deduplication subsystem as illustrated in FIG. 6, previously, including a processor device.

Turning now to FIG. 2, an exemplary portion 500 of a deduplication storage subsystem 106 as also seen in FIG. 1, previously, is illustrated. The portion 500 of the deduplication storage subsystem 106 is operable in a computer environment as a portion thereof, in which mechanisms of the above illustrated embodiments may be implemented. It should be appreciated, however, that FIG. 2 is only exemplary and is not intended to state or imply any limitation as to the particular architectures in which the exemplary aspects of the various embodiments may be implemented. Many modifications to the architecture depicted in FIG. 2 may be made without departing from the scope and spirit of the following description and claimed subject matter.

The deduplication storage subsystem 106 includes a processor 520 and a memory 540, such as random access memory (RAM). The deduplication storage subsystem 106 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the deduplication storage subsystem 106.

In the illustrated embodiment, the deduplication storage subsystem 106 operates under control of an operating system (OS) 560 (e.g. z/OS, OS/2, LINUX, UNIX, WINDOWS, MAC OS) stored in the memory 540, and interfaces with the user to accept inputs and commands and to present results.

The deduplication storage subsystem 106 implements an application program 580 written in a programming language such as COBOL, PL/1, C, C++, JAVA, ADA, BASIC, VISUAL BASIC or any other programming language to be translated into code that is readable by the processor 520. After completion, the application program 580 accesses and may manipulate data stored in the memory 540 of the deduplication storage subsystem 106.

To further implement and execute mechanisms and processes according to the present invention, OS 560, in conjunction with the memory 540, the processor 520, the application program 580, and other computer processing, networking, and storage components, may implement memory buffers 640 in order to receive a new write operation from the client for storing the data, a fragment map 620 to assist in the storage for deduplicated data, a disk map 675 similar to the fragment map 620, a compression module to manage, assist, and perform operations for the opening, compressing, and storing streams of data, and a control module 650 to manage each of the write operations received from a client. The deduplicated documents processed by the deduplication storage subsystem 106 may be stored in the memory 540 in a format consistent with the present invention as depicted in diagrams 2 and 4. As the skilled artisan will appreciate, the mechanisms of the pool of buffers 640, disk map 675, and the fragment map 620 as presently illustrated may be implemented in various forms and architectures. Accordingly, the illustration of the pool of buffers 640, disk map 675, and the fragment map 620 in the present figure is again intended to demonstrate logical relationships between possible computing components in the deduplication storage subsystem 106, and not to imply a specific physical structure or relationship.

In one embodiment, instructions implementing the operating system 560, the application program 580, a deduplication module 660, a compression module 630, and the control module 650, as well as the pool of buffers 640, disk map 675, and fragment map 620 are tangibly embodied in a computer-readable medium, which may include one or more fixed or removable data storage devices, such as a zip drive, disk, hard drive, DVD/CD-ROM, digital tape, SSDs, etc. Further, the operating system 560 and the application program 580 comprise instructions (e.g., in executable portions) which, when read and executed by the deduplication storage subsystem 106, cause the deduplication storage subsystem 106 to perform the steps necessary to implement and/or use the present invention. The application program 580 and/or the operating system 560 instructions may also be tangibly embodied in the memory 540 and/or transmitted through or accessed by network 200 via various components (e.g., router 320, FIG. 6). As such, the terms "article of manufacture," "program storage device" and "computer program product" as may be used herein are intended to encompass a computer program accessible and/or operable from any computer readable device or media.

The deduplication module 660, assists in managing the receiving the plurality of write operations for deduplication storage of the data from a network attached storage (NAS) system. The data is buffered in a plurality of buffers with overflow temporarily stored to a memory hierarchy when the data received for deduplication storage over the NAS system is out of order or non sequential. The data is accumulated and updated in the plurality of buffers per a data structure, the data structure serving as a fragment map between the plurality of buffers and a plurality of user file locations. The data is restructured in the plurality of buffers to form a complete sequence of a required sequence size. The data is provided as at least one stream to a stream-based deduplication algorithm for processing and storage.

Figure 4:
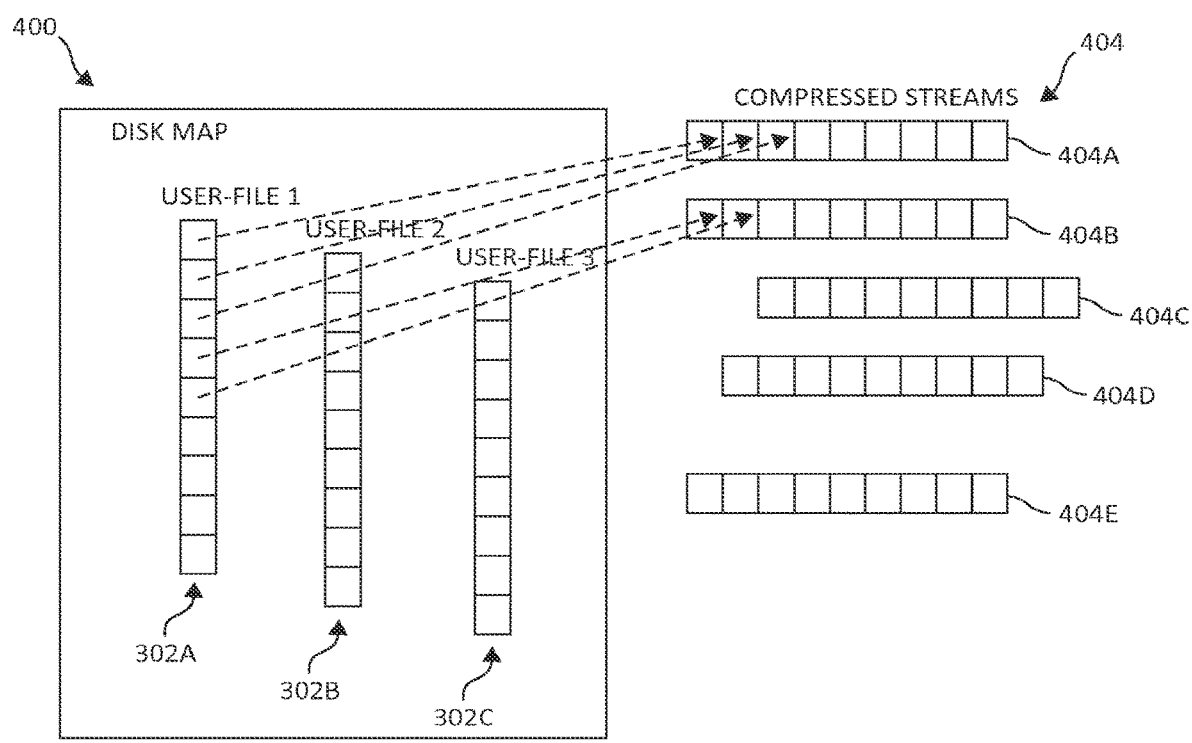
FIG. 4 illustrates an exemplary diagram of a disk map in association with compression streams of a deduplication storage subsystem.

Moreover, the deduplication module is implemented to assist with management of a plurality of compression streams and mapping the user-file fragments to compression streams. This allows the data of each user-files to reside in more than one compression stream 404 (FIG. 4). Moreover, the compression streams may be in their non-compressed form meaning the division to fragments is not according to the size of the compressed stream but according to the size of the uncompressed stream.

Embodiments of the present invention may include one or more associated software application programs 580 that include, for example, functions for managing a distributed computer system comprising a network of computing devices, such as a storage area network (SAN). Accordingly, the processor 520 may comprise one or more storage management processors (SMP). The application program 580 may operate within a single computer and/or deduplication storage subsystem 106 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

Storage 130 (includes all storage components shown in the figure as 130A, 130B, and 130n) may be physically comprised of one or more storage devices, such as storage arrays. A storage array is a logical grouping of individual storage devices, such as a hard disk. In certain embodiments, storage 130 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

As shown in FIG. 2, a logical volume, or simply "volume," may have different kinds of allocations. Storage 130A is shown configured with two entire volumes, 134 and 136 and a partial volume 132A. Storage 130B is shown with another partial volume 132b and an entire volume 140. Storage 130n is shown as being fully allocated to volume 138. From the above examples, it will be appreciated that the storage 130 may be configured to include one or more partial and/or entire volumes. Volumes may further be divided into so-called "tracks," which represent a fixed block of storage. A track is therefore associated with a given volume.

Figure 3:
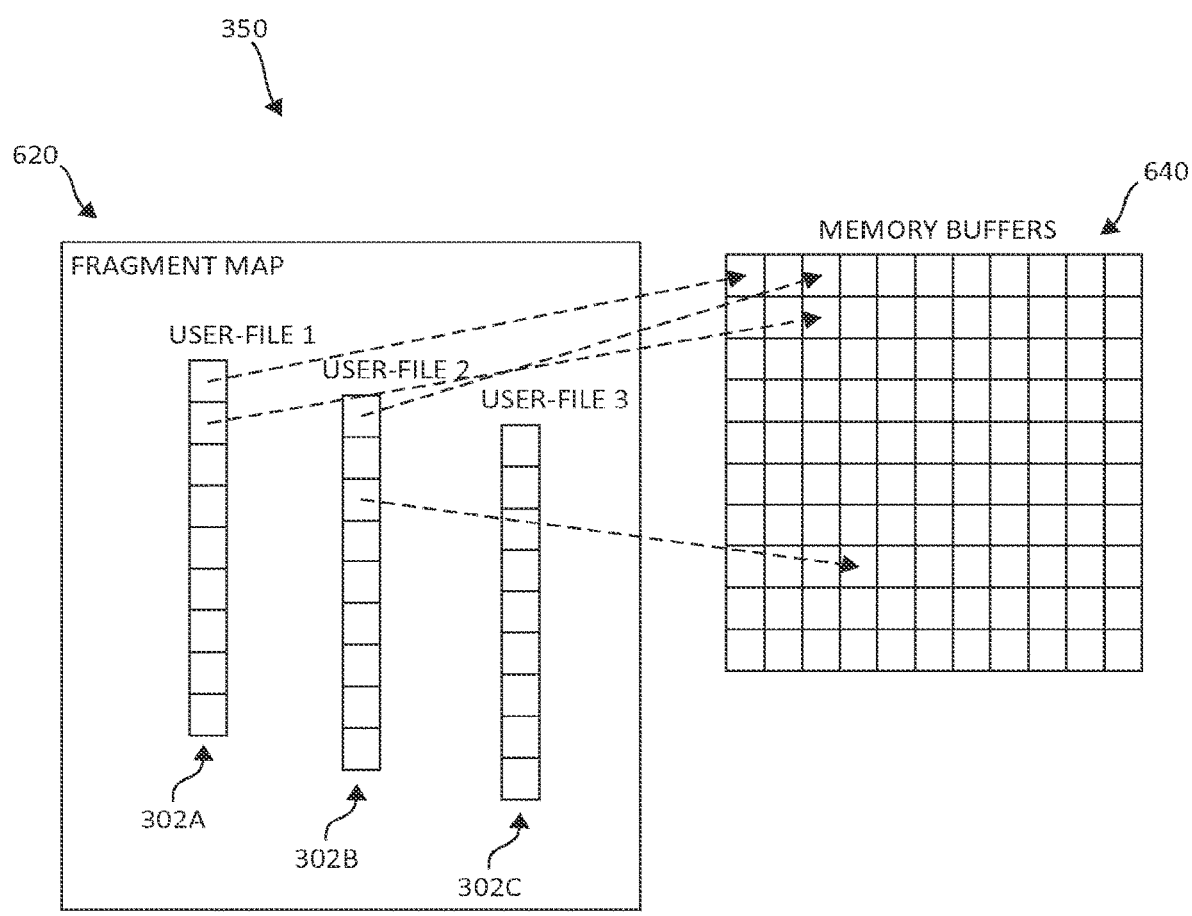
FIG. 3 illustrates an exemplary diagram 350 of a fragment map in association with memory buffers.

FIG. 3 illustrates an exemplary diagram 350 fragment map in association with memory buffers in a deduplication storage subsystem (300, FIG. 1) via a NAS interface using memory buffers 640. The exemplary diagram 350 includes a pool of buffers 640 in a relationship between user-files 302 (Shown in FIG. 3 as 302A, 302B, and 302C) as expressed by the fragments-map 620. Some of the user-files 302 fragments may be associated with specified memory buffers 640 (FIG. 3 illustrates a pool of buffers). This may occur when the data for the fragment has not yet been sent from the client.

The Control module (650, FIG. 2) is implemented according to the following rules: for each new active user-file, a compression stream (404, FIG. 4) is opened in the stream-based compression module. For each such stream, a current writing-offset (offset) is kept and maintained in memory (540, FIG. 2). The offset represents the last offset in the user-file 302 that was written into the stream (404, FIG. 4). Whenever a new write operation is received from a user, a memory buffer 640 is allocated for the new write operation and the data is stored in the memory buffer 640. The fragment map 620 is updated to reflect the new association. Whenever a fragment is ready, which is adjacent to the current-writing-offset, the fragment is written into the compression-stream (404, FIG. 4) and the current-writing-offset is advanced accordingly. The memory buffers 640 of the written fragments can now be freed.

Turning to FIG. 4, illustrates an exemplary diagram of a disk map in association with compression streams of a deduplication storage subsystem. The exemplary diagram 400 includes a compression streams 404 in a relationship with a disk map 402 with user files 302 stored in the disk map 402. In one embodiment, the implementation may be enhanced to include an on-disk structure, called disk-map 675, which is similar to the fragments-map (620, FIG. 2) and which maps the user-file 302 (shown in FIG. 4 as 302A, 302B, 302C) fragments to compression streams 404 (shown individually in FIG. 4 as 404A, 404B, 404C, 404D, and 404E). This allows the data of each user-files 302 to reside in more than one compression stream 404. Moreover, the compression streams may be in their non-compressed form meaning the division to fragments is not according to the size of the compressed stream but according to the size of the uncompressed stream. The compression streams may be opened, compressed, and stored.

The implementation of Control module (650, FIG. 2) enhances the logic of the control module in the present invention. Similar to the functionality mentioned above, for each new active user-file, at least one compression stream (404, FIG. 4) is opened in the stream-based compression module. For each such stream, a current writing offset (offset) is kept and maintained in memory (540, FIG. 540). The offset represents the last offset in the user-file 302 that was written into the stream (404, FIG. 4). Whenever a new write operation is received from a user, a memory buffer 640 is allocated for the new write operation and the data is stored in the memory buffer 640. The fragment map (620, FIG. 3) is updated to reflect the new association. Whenever a fragment is ready, which is adjacent to the current writing offset, the fragment is written into the compression-stream 404 and the current writing offset is advanced accordingly. The memory buffers 640 of the written fragments can now be freed.

In one embodiment, by way of example only, if there is a shortage of memory buffers 640, and there is a large enough sequence of fragments available in memory, the present invention will open a new stream 404 and write the sequence of fragments to the stream 440. By writing the sequence of fragments to the stream 44, the memory buffers 640 are released. The "large enough sequence" mentioned above is defined as a sequence of written fragments that is longer than a pre-determined threshold. In order to increase efficiency, this threshold can be made to depend on the number of memory buffers 640 that are still available. If there are several available memory buffers 640, the fragments may be very large, and the fragments may be made smaller when memory buffers 640 become scarce.

In the event that an overwrite occurs (i.e. the user writes to an area that in the user file 302 for which there already exist "old" data, either on-disk or in memory), a new stream 404 may be opened for the overwrite and the disk-map is simply updated to point to the new data. However, it is possible for the user-files 302 to become fragmented over many streams and there may exist data in compressed-streams 404 that is "old", i.e. that has been overwritten by new data, which is kept elsewhere, in other compression-streams 404.

In one embodiment, these challenges are solved by including a de-fragmentation process, which runs after each user-file 302 is closed, an arbitrary period of time determined by the user preferences, or when the plurality of user files are determined to be quiescent. The de-fragmentation operation re-arranges the (possibly many) compression-streams 404 of each user-file into a single compression-stream, and discards the overwritten and un-needed portions.

Figure 5:
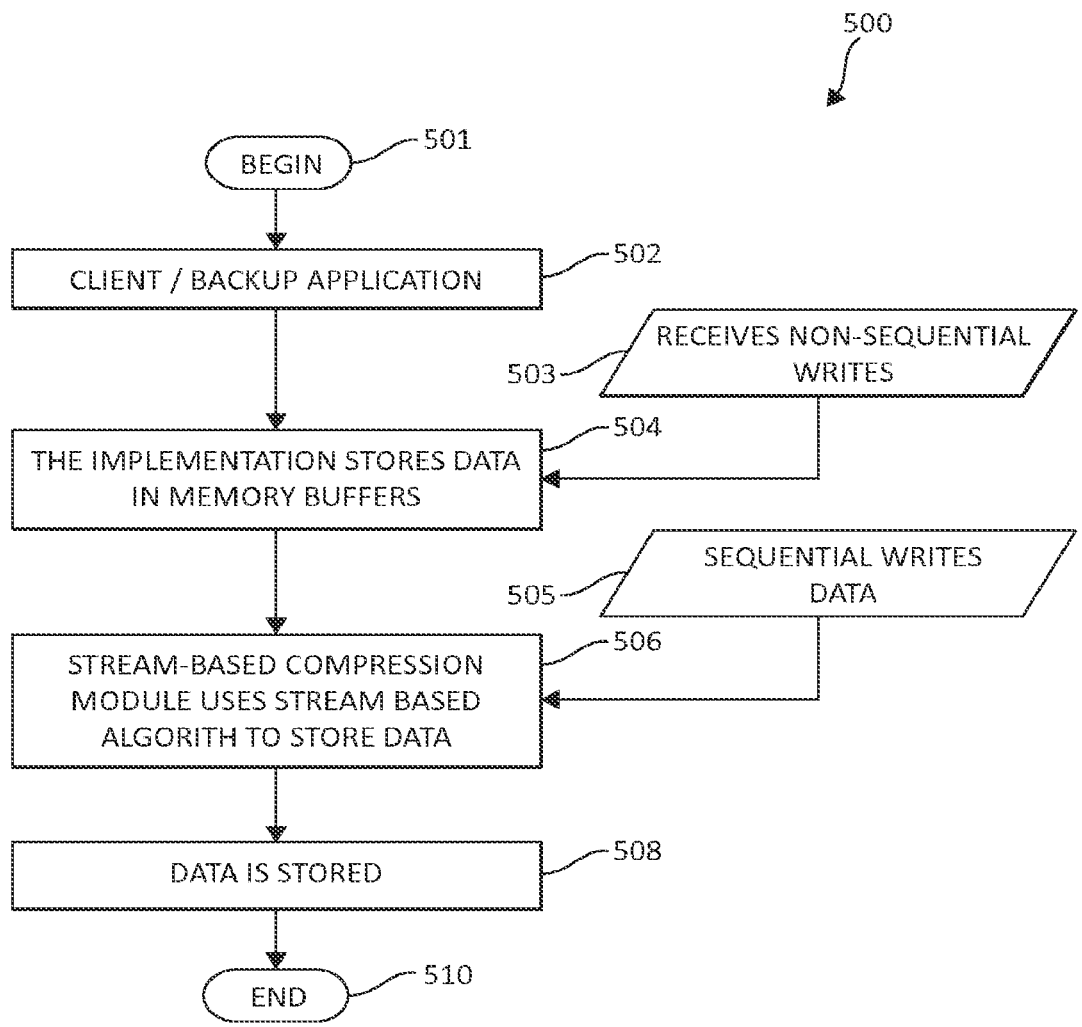
FIG. 5 illustrates a flow chart of an exemplary method for implementation of the present invention.

Turning to FIG. 5, a flow chart illustrating an exemplary method 500 for implementation of the present invention is shown. The method 500 begins (step 501) and the client/backup application issues a write command (step 502). The method 500 includes receiving non sequential data (step 503) and commences the implementation of storing the data in memory buffers (step 504). The method 500 sequentially restructures the data to be sufficiently sequential to be used in a stream-based algorithm (step 505) and passes the sequential data by a stream-based algorithm using a stream-based compression module (step 506). The method 500 then stores the deduplicated data (step 508) and the method ends (step 510). It should be noted that although FIG. 5 is presented in a flow chart form as illustrated, any number of implementations of these blocks of functionality are contemplated (e.g., as part of a more complex flow, or in another order, etc.) For example, the block 505 of sequentially restructuring the data to be sufficiently sequential to be used a stream-based algorithm may be implemented, performed individually and in a more complex flow or process. Also, block 506 describing the passing the sequential data by a stream-based algorithm using a stream-based compression module may be performed in a more complex process and in a different order than as illustrated in FIG. 5.

Figure 6:
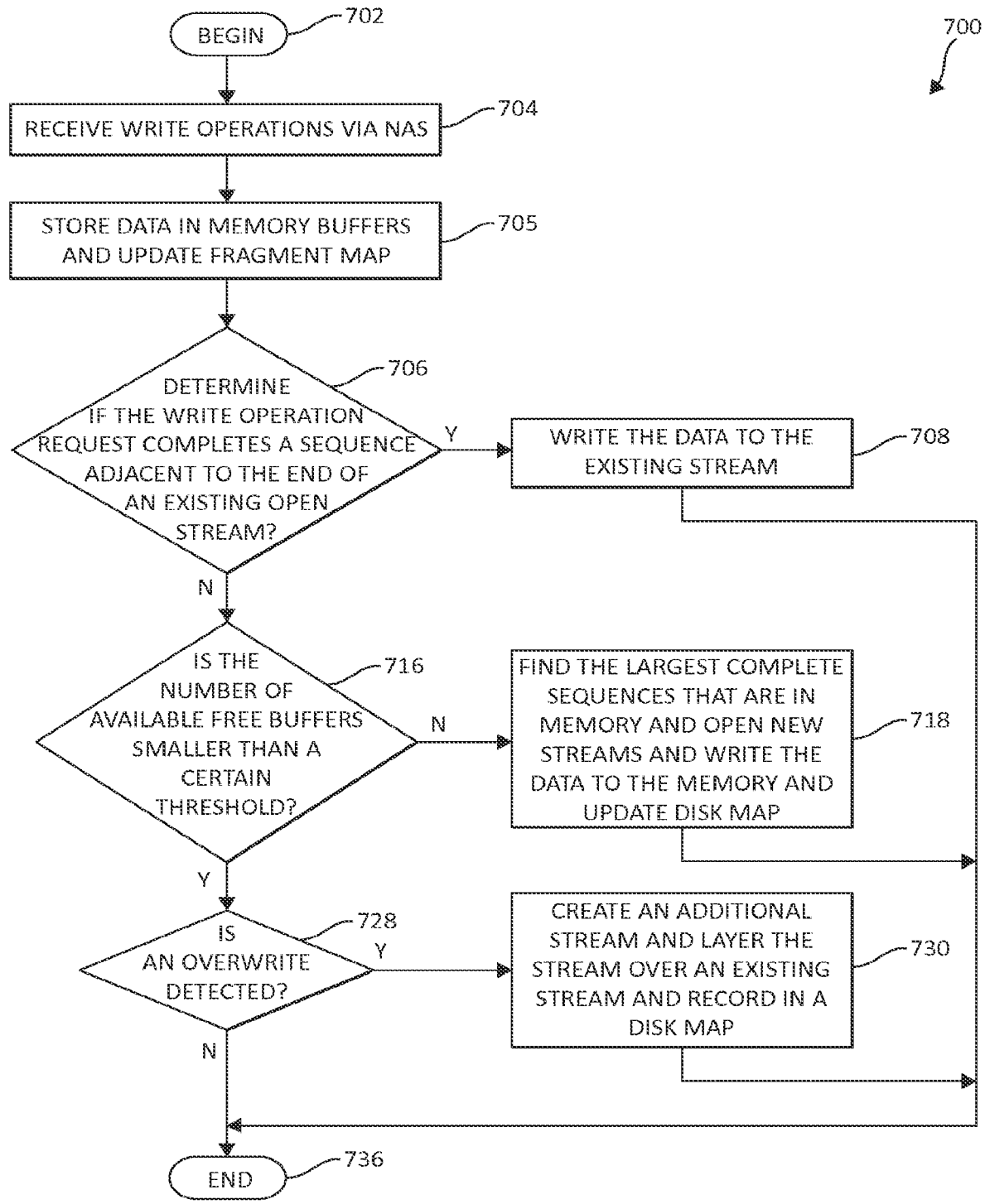
FIG. 6 illustrates a flow chart of an exemplary method for implementation of the deduplication storage subsystem.

Turning to FIG. 6, a flow chart illustrating an exemplary method 700 for implementation of the deduplication storage subsystem is presented. The method 700 begins (step 702) and receives a write operation from the NAS (step 704). Upon receiving the write operation requests via the NAS protocol (NFS or CIFS), the method 700 acts and performs according to the write operation requests and stores the data in a plurality of buffers and update a fragment map (step 705). The method 700 will determine if the write operation request completes a sequence adjacent to the end of an existing open stream (step 706) and if yes, write the data to the existing stream (708) and the method 700 will end (step 736). If no, the method 700 will determine if the number of available free buffers are smaller than a certain threshold (step 716). The threshold may be determined by, but not limited to, the user, the number of available free buffers, the total number of buffers, and a memory hierarchy. If no, the method 700 will find the largest complete sequences that are in memory and open new streams and write the data to the memory and update a disk map (718) and the method will end (step 736). If yes, the method 700 will check if there is an overwrite detected (i.e. a write operation that overlaps with the file-offsets of any previous write operation) (step 728). If yes, an additional stream is created and will layer the stream over an existing stream and record in the disk map (step 730) and the method 700 will end (step 736). If no, the method 700 ends (step 736).

It should be noted that in one exemplary embodiment, when a write operation is received via a NAS just adjacent to the (logical) end of an existing stream two events may occur: first, the write operation data request may be appended to the end of an existing stream, and second, any subsequent sequence may be appended which the write operation may have completed. The temporary storage area may not be required. If the temporary storage area is not implemented, adapted, or used, the sequences sent to the stream-based algorithm may become smaller and reduced in size.

It should be noted that execution orders of processes, such as operations, procedures, steps and stages in the devices, systems, programs and methods shown in the scope of claims, the description and the drawings, are not clearly specified particularly by use of expressions such as "before" and "prior to." Therefore, those processes are executable in any order unless an output from a preceding process is used in a process subsequent thereto. Even if any operational flow in the scope of claims, in the description or in the drawings has been described by use of expressions such as "firstly," and "subsequently," for the sake of convenience, this does not necessarily mean that the operational flow has to be executed by an order indicated by these expressions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for processing data by a processor device, comprising:
   receiving a plurality of non-sequential write operations for deduplication storage of the data;
   storing the data in a plurality of user file locations;
   accumulating the data in a plurality of buffers per a data structure, the data structure serving as a fragment map between the plurality of buffers and the plurality of user file locations;
   restructuring the data in the plurality of buffers to form a complete sequence of a required sequence size of sequential data;
   providing the sequential data as a plurality of streams to a stream-based deduplication algorithm for processing and storage; and
   performing a defragmentation process after each of closing a plurality of user files, an arbitrary time period, and when the plurality of user files are determined to be quiescent, the defragmentation operation rearranging streams in each of the plurality of user files into a single stream.

2. The method of claim 1, further comprising configuring a relationship between the plurality of user files and the plurality of buffers by performing one or more of:
   associating at least one of the plurality of user files with at least one of the plurality of buffers;
   opening at least one stream for the plurality of user files;
   maintaining an offset for each stream, the offset representing a last offset in the plurality of user files written into the at least one stream; and
   allocating the at least one of the plurality of buffers for each of the plurality of write operations, wherein the fragment map is updated reflecting the association of the plurality of buffers for each of the plurality of write operations.

3. The method of claim 2, wherein upon the data being adjacent to the offset, writing the data into plurality of streams and advancing the offset for each of the plurality of streams and freeing the plurality of buffers of the data.

4. The method of claim 1, wherein the upon the detection of an overwrite in the plurality of buffers by at least one of the plurality of write operations, creating an additional stream and layering the additional stream over an existing stream.

5. The method of claim 1, further comprising closing at least one of the plurality of user files by merging any one of adjacent and overlapping streams into at least one of the plurality of streams.

6. The method of claim 1, further comprising mapping, via a disk map, the data stored in the plurality of user file locations to the plurality of streams, wherein at least a portion of the data stored in the plurality of user file locations is mapped to at least two streams in the plurality of streams.

7. The method of claim 1, further comprising temporarily storing an overflow of the data buffered in a plurality of buffers to a memory hierarchy.

8. A system for processing data in a computing environment, comprising:
   a processor executing instructions stored in a memory device, wherein the processor, when executing the instructions:
   receives a plurality of non-sequential write operations for deduplication storage of the data;
   stores the data in a plurality of user file locations;
   accumulates the data in a plurality of buffers per a data structure, the data structure serving as a fragment map between the plurality of buffers and the plurality of user file locations;
   restructures the data in the plurality of buffers to form a complete sequence of a required sequence size of sequential data;
   provides the sequential data as a plurality of streams to a stream-based deduplication algorithm for processing and storage; and
   performs a defragmentation process after each of closing a plurality of user files, an arbitrary time period, and when the plurality of user files are determined to be quiescent, the defragmentation operation rearranging streams in each of the plurality of user files into a single stream.

9. The system of claim 8, wherein the processor configures a relationship between the plurality of user files and the plurality of buffers by performing one or more of:
   associating at least one of the plurality of user files with at least one of the plurality of buffers;
   opening at least one stream for the plurality of user files;
   maintaining an offset for each stream, the offset representing a last offset in the plurality of user files written into the at least one stream; and
   allocating the at least one of the plurality of buffers for each of the plurality of write operations, wherein the fragment map is updated reflecting the association of the plurality of buffers for each of the plurality of write operations.

10. The system of claim 9, wherein the processor, upon the data being adjacent to the offset, writes the data into the plurality of streams and advancing the offset for each of the plurality of streams and freeing the plurality of buffers of the data.

11. The system of claim 8, wherein the processor, upon the detection of an overwrite in the plurality of buffers by at least one of the plurality of write operations, creates an additional stream and layering the additional stream over an existing stream.

12. The system of claim 8, wherein the processor closes at least one of the plurality of user files by merging any one of adjacent and overlapping streams into at least one of the plurality of streams.

13. The system of claim 8, wherein the processor maps, via a disk map, the data stored in the plurality of user file locations to the plurality of streams, wherein at least a portion of the data stored in the plurality of user file locations is mapped to at least two streams in the plurality of streams.

14. The system of claim 8, wherein the processor temporarily stores an overflow of the data buffered in a plurality of buffers to a memory hierarchy.

15. A computer program product for processing data in a computing environment by a processor device, the computer program product comprising a non-transitory computer-readable storage medium comprising:
    computer code for receiving a plurality of non-sequential write operations for deduplication storage of the data;
    computer code for storing the data in a plurality of user file locations;
    computer code for accumulating the data in a plurality of buffers per a data structure, the data structure serving as a fragment map between the plurality of buffers and the plurality of user file locations;
    computer code for restructuring the data in the plurality of buffers to form a complete sequence of a required sequence size of sequential data;
    computer code for providing the sequential data as a plurality of streams to a stream-based deduplication algorithm for processing and storage; and
    computer code for performing a defragmentation process after each of closing a plurality of user files, an arbitrary time period, and when the plurality of user files are determined to be quiescent, the defragmentation operation rearranging streams in each of the plurality of user files into a single stream.

16. The computer program product of claim 15, wherein the computer-readable storage medium further comprises computer code for configuring a relationship between the plurality of user files and the plurality of buffers by performing one or more of:
    associating at least one of the plurality of user files with at least one of the plurality of buffers;
    opening at least one stream for the plurality of user files;
    maintaining an offset for each stream, the offset representing a last offset in the plurality of user files written into the at least one stream; and
    allocating the at least one of the plurality of buffers for each of the plurality of write operations, wherein the fragment map is updated reflecting the association of the plurality of buffers for each of the plurality of write operations.

17. The computer program product of claim 15, wherein the computer-readable storage medium further comprises computer code for, upon the data being adjacent to the offset, writing the data into plurality of streams and advancing the offset for each of the plurality of streams and freeing the plurality of buffers of the data.

18. The computer program product of claim 15, wherein the computer-readable storage medium further comprises computer code for, upon the detection of an overwrite in the plurality of buffers by at least one of the plurality of write operations, creating an additional stream and layering the additional stream over an existing stream.

19. The computer program product of claim 15, wherein the computer-readable storage medium further comprises computer code for closing at least one of the plurality of user files by merging any one of adjacent and overlapping streams into at least one of the plurality of streams.

20. The computer program product of claim 15, wherein the computer-readable storage medium further comprises computer code for mapping, via a disk map, the data stored in the plurality of user file locations to the plurality of streams, wherein at least a portion of the data stored in the plurality of user file locations is mapped to at least two streams in the plurality of streams.

* * * * *